United States Patent
Gan et al.

(10) Patent No.: US 11,769,319 B2
(45) Date of Patent: Sep. 26, 2023

(54) METHOD AND DEVICE FOR PREDICTING BEAUTY BASED ON MIGRATION AND WEAK SUPERVISION, AND STORAGE MEDIUM

(71) Applicant: Wuyi University, Jiangmen (CN)

(72) Inventors: Junying Gan, Jiangmen (CN); Zhenfeng Bai, Jiangmen (CN); Yikui Zhai, Jiangmen (CN); Guohui He, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 270 days.

(21) Appl. No.: 17/414,196

(22) PCT Filed: Jul. 24, 2020

(86) PCT No.: PCT/CN2020/104569
§ 371 (c)(1),
(2) Date: Jun. 15, 2021

(87) PCT Pub. No.: WO2021/258482
PCT Pub. Date: Dec. 30, 2021

(65) Prior Publication Data
US 2022/0309768 A1    Sep. 29, 2022

(30) Foreign Application Priority Data

Jun. 24, 2020 (CN) .......................... 202010586901.9

(51) Int. Cl.
G06V 10/774 (2022.01)
G06V 40/16 (2022.01)
(Continued)

(52) U.S. Cl.
CPC ............ *G06V 10/774* (2022.01); *G06V 10/20* (2022.01); *G06V 10/809* (2022.01); *G06V 10/82* (2022.01); *G06V 40/168* (2022.01); *G06V 40/172* (2022.01)

(58) Field of Classification Search
CPC .... G06V 10/20; G06V 10/774; G06V 10/809; G06V 10/82; G06V 40/16; G06V 40/168; G06V 40/172
See application file for complete search history.

(56) References Cited

U.S. PATENT DOCUMENTS

| 11,126,826 | B1* | 9/2021 | Karakas | ............... G06V 40/174 |
| 2020/0387750 | A1* | 12/2020 | Shcherbinin | .......... G06T 3/4053 |
| 2022/0076000 | A1* | 3/2022 | Yang | .................... G06V 20/597 |

FOREIGN PATENT DOCUMENTS

| CN | 108182394 A | 6/2018 |
| CN | 108520213 A | 9/2018 |

(Continued)

OTHER PUBLICATIONS

Lin et al, "Attribute-Aware Convolutional Neural Networks for Facial Beauty Prediction", IJCAI-19 (Year: 2019).*

*Primary Examiner* — Ruiping Li
(74) *Attorney, Agent, or Firm* — Vivacqua Crane, PLLC (57) ABSTRACT

Disclosed are a method and device for predicting face beauty based on migration and weak supervision and a storage medium. The method includes: preprocessing an inputted face image; training a source domain network by using the preprocessed image, and migrating a parameter of the source domain network to a target domain network; inputting a noise image marked with a noise label and a truth-value image marked with a truth-value label into the target domain network to obtain an image feature; and (Continued)

inputting the image feature into a classification network to obtain a final face beauty prediction result.

12 Claims, 3 Drawing Sheets

(51) Int. Cl.
*G06V 10/20* (2022.01)
*G06V 10/80* (2022.01)
*G06V 10/82* (2022.01)

(56) References Cited

FOREIGN PATENT DOCUMENTS

| | | | |
|---|---|---|---|
| CN | 108629338 | A | 10/2018 |
| CN | 109344855 | A | 2/2019 |
| CN | 109492666 | A | 3/2019 |
| CN | 110119689 | A | 8/2019 |
| CN | 110414489 | A | 11/2019 |
| CN | 110705406 | A | 1/2020 |
| CN | 110728294 | A | 1/2020 |
| CN | 111274422 | A | 6/2020 |

* cited by examiner

| AA | Preprocessed image | 110 | Source domain network |
| BB | Parameter migration | 120 | Target domain network |
| CC | Noise label | 210 | Residual network |
| DD | Noise image | 220 | Standard neural network |
| EE | True-value label | 230 | First classifier |
| FF | True-value image | 240 | Second classifier |

FIG. 3

METHOD AND DEVICE FOR PREDICTING BEAUTY BASED ON MIGRATION AND WEAK SUPERVISION, AND STORAGE MEDIUM

CROSS-REFERENCE TO RELATED APPLICATIONS

This application is a national stage filing under 35 U.S.C. § 371 of international application number PCT/CN2020/104569, filed Jul. 24, 2020, which claims priority to Chinese patent application No. 2020105869019 filed Jun. 24, 2020. The contents of these applications are incorporated herein by reference in their entirety.

TECHNICAL FIELD

The present disclosure relates to the field of image processing, and more particularly, to a method and device for predicting beauty based on migration and weak supervision and a storage medium.

BACKGROUND

Face beauty prediction technology is a combination of image processing and artificial intelligence to intelligently judge a face beauty level. At present, the face beauty prediction technology is mainly implemented by deep learning, but a deep learning network requires a large number of training samples, has an easily overfitted training model, ignores a correlation and a difference between multiple tasks, has a high cost on data labeling in strong supervised learning, and ignores an actual situation that it is difficult to obtain all truth value labels in a database. At present, most tasks are model training for a single task and strong label data, the single task ignores the relevance between the tasks, and tasks in real life are often inextricably linked; and it is difficult to obtain all strong label data in real life, and it is expensive to obtain all true-value labels.

SUMMARY

The present disclosure aims to solve at least one of the technical problems in the prior art, and provides a method and device for predicting beauty based on migration and weak supervision and a storage medium.

The technical solutions used in the present disclosure to solve the problems are as follows.

In a first aspect of the present disclosure, the method for predicting beauty based on migration and weak supervision includes:

preprocessing an inputted face image to obtain a preprocessed image;

training a source domain network by using the preprocessed image, and migrating a parameter of the trained source domain network to a target domain network, wherein in the migrating process, for the source domain network, a loss function of the source domain network is obtained according to an output of a softmax layer of the source domain network with a T value greater than 1 and an original label; for the target domain network, a first sub-loss function of the target domain network is obtained according to an output of a softmax layer of the target domain network with a T value greater than 1 and the original label, a second sub-loss function of the target domain network is obtained according to the output of the softmax layer of the target domain network with the T value equal to 1 and the original label, and the first sub-loss function and the second sub-loss function are added to obtain a loss function of the target domain network;

classifying the preprocessed image into a noise image marked with a noise label and a truth-value image marked with a truth-value label, and inputting the noise image and the truth-value image into the target domain network to obtain an image feature; and inputting the image feature into a residual network to learn mapping from the image feature to a difference value between the noise label and the truth-value label to obtain a first predicted value, inputting the image feature into a standard neural network to learn mapping from the image feature to the truth-value label to obtain a second predicted value, adding the first predicted value and the second predicted value and then inputting the added value into a first classifier to obtain a first face beauty prediction result, inputting the second predicted value into a second classifier to obtain a second face beauty prediction result, and obtaining a final face beauty prediction result according to the first face beauty prediction result and the second face beauty prediction result.

According to the first aspect of the present disclosure, the preprocessing an inputted face image to obtain a preprocessed image specifically includes: sequentially performing image enhancement processing, image correction processing, image clipping processing, image de-duplicating processing and image normalization processing on the face image to obtain the preprocessed image.

According to the first aspect of the present disclosure, the T value is a regulation parameter, which is defined in a softmax function of the softmax layer, and the softmax function is specifically:

$$q_i = \frac{e^{\frac{z_i}{T}}}{\sum_j e^{\frac{z_j}{T}}},$$

wherein $q_i$ is an output of the softmax function, and $z$ is an input of the softmax function.

According to the first aspect of the present disclosure, the loss function of the first classifier is:

$$L_{noise} = -\frac{1}{N_n} \sum_{i \in D_n} (y_i \ln(h_i) + (1 - y_i)\ln(1 - h_i)),$$

and the loss function of the second classifier is:

$$L_{clean} = -\frac{1}{N_c} \sum_{j \in D_c} (v_j \ln(g_j) + (1 - v_j)\ln(1 - g_j)),$$

wherein $h_i$ is a sum of the first predicted value and the second predicted value, $g_j$ is the second predicted value, $y_i$ is the noise label, $v_j$ is the truth-value label, $D_n$ is the image feature, and $N_n$ is the number of the image feature.

In a second aspect of the present disclosure, the device for predicting beauty based on migration and weak supervision includes:

a preprocessing module configured for preprocessing an inputted face image to obtain a preprocessed image;

a migrating module configured for training a source domain network by using the preprocessed image, and migrating a parameter of the trained source domain network to a target domain network, wherein in the migrating process, for the source domain network, a loss function of the source domain network is obtained according to an output of a softmax layer of the source domain network with a T value greater than 1 and an original label; for the target domain network, a first sub-loss function of the target domain network is obtained according to an output of a softmax layer of the target domain network with a T value greater than 1 and the original label, a second sub-loss function of the target domain network is obtained according to the output of the softmax layer of the target domain network with the T value equal to 1 and the original label, and the first sub-loss function and the second sub-loss function are added to obtain a loss function of the target domain network;

a feature extracting module configured for classifying the preprocessed image into a noise image marked with a noise label and a truth-value image marked with a truth-value label, and inputting the noise image and the truth-value image into the target domain network to obtain an image feature; and a classifying module configured for inputting the image feature into a residual network to learn mapping from the image feature to a difference value between the noise label and the truth-value label to obtain a first predicted value, inputting the image feature into a standard neural network to learn mapping from the image feature to the truth-value label to obtain a second predicted value, adding the first predicted value and the second predicted value and then inputting the added value into a first classifier to obtain a first face beauty prediction result, inputting the second predicted value into a second classifier to obtain a second face beauty prediction result, and obtaining a final face beauty prediction result according to the first face beauty prediction result and the second face beauty prediction result.

According to the second aspect of the present disclosure, the preprocessing an inputted face image to obtain a preprocessed image specifically includes: sequentially performing image enhancement processing, image correction processing, image clipping processing, image de-duplicating processing and image normalization processing on the face image to obtain the preprocessed image.

According to the second aspect of the present disclosure, the T value is a regulation parameter, which is defined in a softmax function of the softmax layer, and the softmax function is specifically:

$$q_i = \frac{e^{\frac{z_i}{T}}}{\sum_j e^{\frac{z_j}{T}}},$$

wherein $q_i$ is an output of the softmax function, and z is an input of the softmax function.

According to the second aspect of the present disclosure, the loss function of the first classifier is:

$$L_{noise} = -\frac{1}{N_n} \sum_{i \in D_n} (y_i \ln(h_i) + (1-y_i)\ln(1-h_i)),$$

and the loss function of the second classifier is:

$$L_{clean} = -\frac{1}{N_c} \sum_{j \in D_c} (v_j \ln(g_j) + (1-v_j)\ln(1-g_j)),$$

wherein $h_i$ is a sum of the first predicted value and the second predicted value, $g_j$ is the second predicted value, $y_i$ is the noise label, $v_j$ is the truth-value label, $D_n$ is the image feature, and $N_n$ is the number of the image feature.

According to a third aspect of the present disclosure, a device for predicting beauty based on migration and weak supervision includes a processor and a memory connected with the processor, wherein the memory is configured to store an executable instruction which, when executed by the processor, causes to execute the method for predicting beauty based on migration and weak supervision according to the first aspect of the present disclosure.

According to a fourth aspect of the present disclosure, the storage medium stores an executable instruction which, when executed by a computer, causes the computer to execute the method for predicting beauty based on migration and weak supervision according to the first aspect of the present disclosure.

The above solutions at least have the following beneficial effects: a problem of insufficient number of samples is solved by migration, and the target domain network is enhanced by using the parameter of the source domain network, so that problems of an excessively large data volume required by a model, easy overfitting of the model, a weak generalization ability of the model, and a long training time are effectively solved, and the stability and robustness of the model are improved; moreover, a problem of unreliability of a database label is solved, and relevant model training may also be performed under a condition that a data label is inaccurate, insufficient and unspecific; and the present disclosure is adaptable, and can reduce a cost of data labeling and an influence of error labeling on the model.

The additional aspects and advantages of the present disclosure will be partially provided in the following description, and will partially be apparent from the following description, or learned by practice of the present disclosure.

BRIEF DESCRIPTION OF THE DRAWINGS

The present disclosure is further described hereinafter with reference to the accompanying drawings and the embodiments.

DETAILED DESCRIPTION

This part will describe the specific embodiments of the present disclosure in detail, and the preferred embodiments of the present disclosure are shown in the accompanying drawings. The accompanying drawings are used to supplement the description of the text in the description with the graphs, so that people can intuitively and vividly understand each technical feature and the overall technical solution of the present disclosure, but the accompanying drawings cannot be understood as limiting the scope of protection of the present disclosure.

In the description of the present disclosure, it should be understood that the orientation or position relationship indicated by the terms "up", "down", "front", "rear", "left", "right", and the like is based on the orientation or position relationship shown in the accompanying drawings, it is only for the convenience of description of the present disclosure and simplification of the description, and it is not to indicate or imply that the indicated device or element must have a specific orientation, and be constructed and operated in a specific orientation. Therefore, the terms shall not be understood as limiting the present disclosure.

In the description of the present disclosure, several refers to one or more, and a plurality of or multiple refers to be more than two. Greater than, less than, more than, and the like are understood as not including this number, while above, below, within, and the like are understood as including this number. If the terms "first" and "second" are described, the descriptions are used for the purpose of distinguishing the technical features only, and cannot be understood as indicating or implying relative importance, implicitly indicating the number of technical features indicated thereby, or implicitly indicating the order of technical features indicated thereby.

In the description of the present disclosure, the terms arrangement, mounting, connection and the like are to be understood in broad sense unless otherwise specified and defined. The specific meaning of the above terms in the present disclosure may be reasonably determined according to specific contents of the technical solutions by those skilled in the art.

Figure 1:
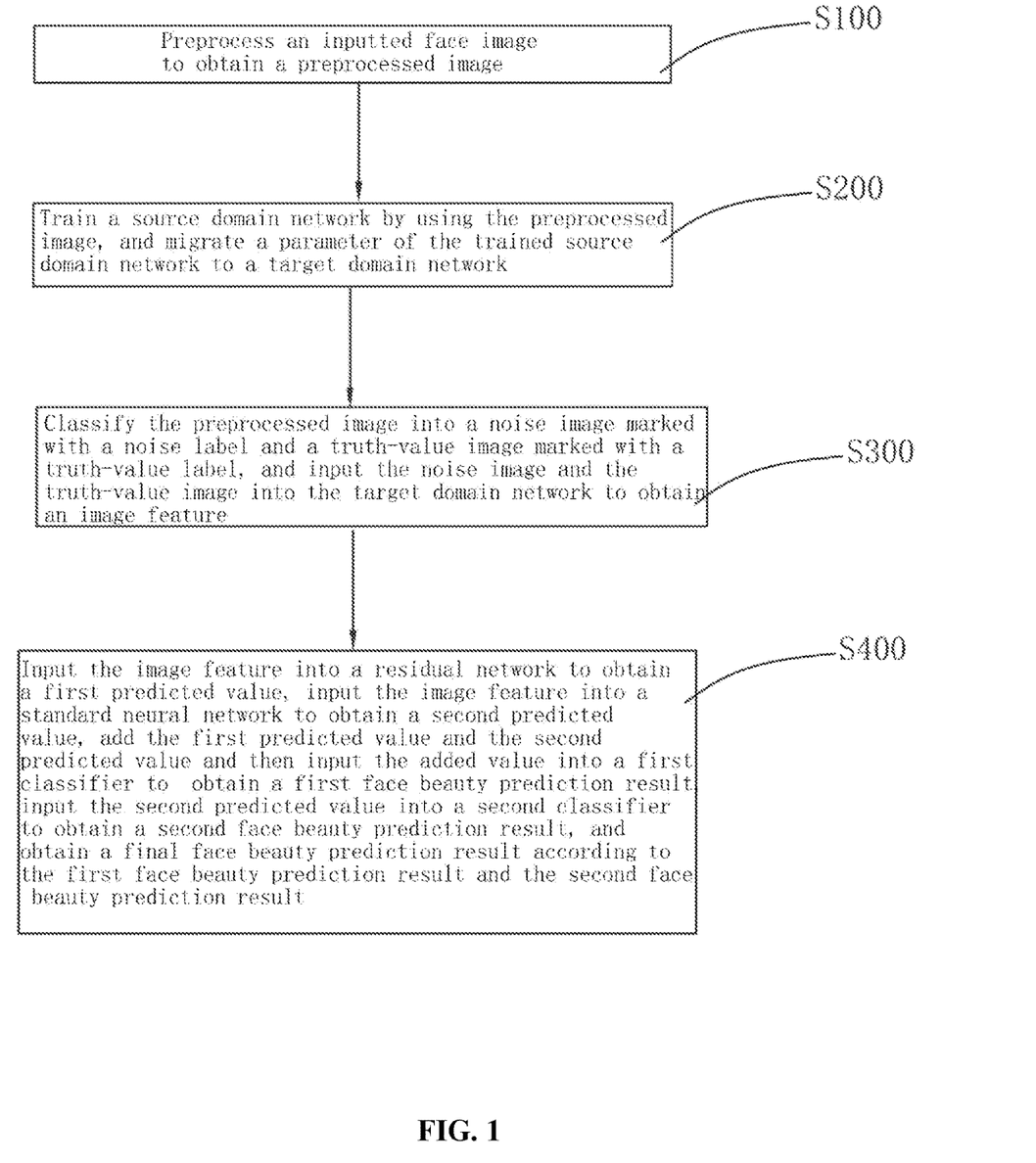
FIG. 1 is a flow chart of a method for predicting beauty based on migration and weak supervision according to an embodiment of the present disclosure.
Figure 3:
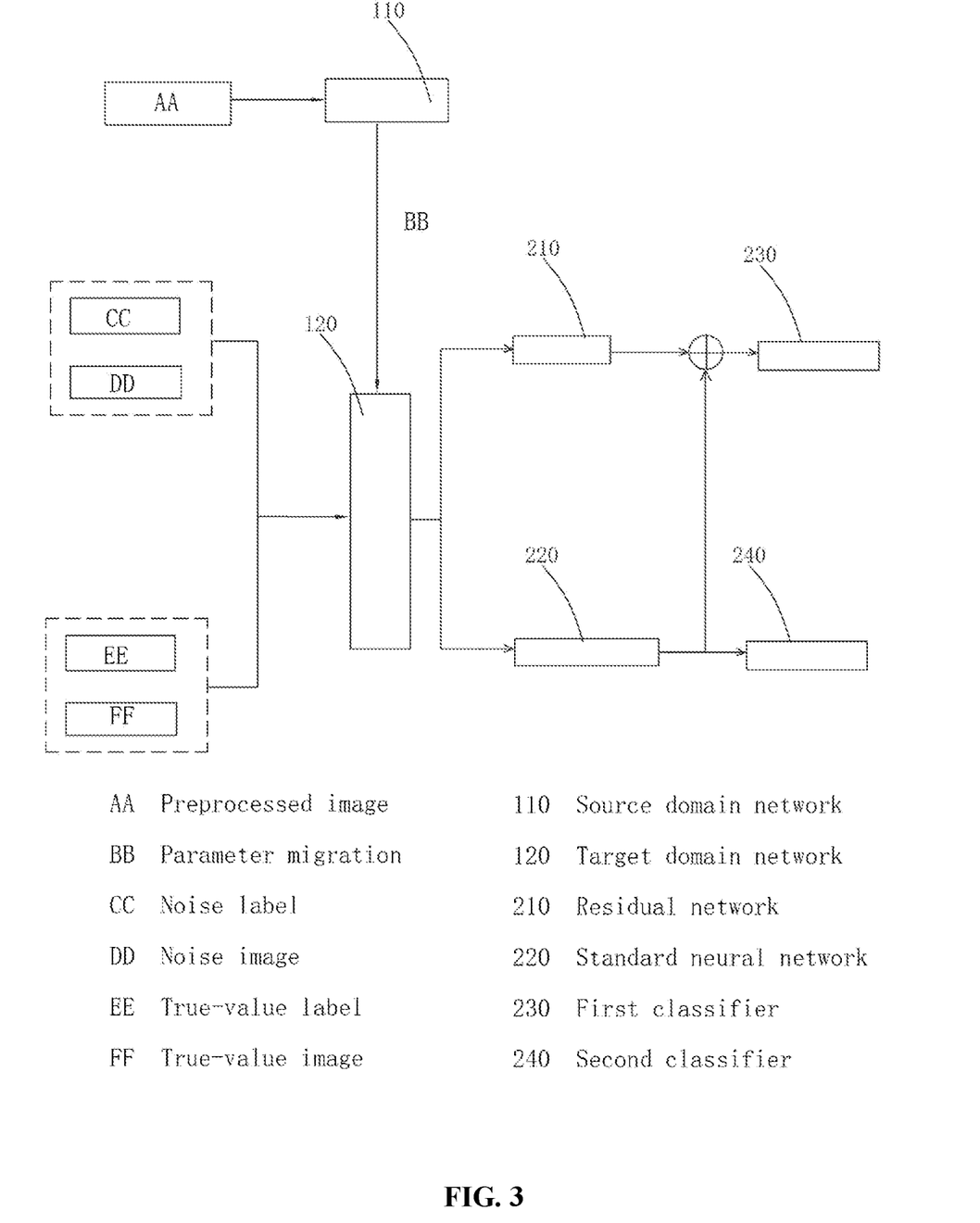
FIG. 3 is a structure diagram of a face beauty prediction model.

As shown in FIG. 1 and FIG. 3, some embodiments of the present disclosure provide a method for predicting beauty based on migration and weak supervision, which includes the following steps of:

step S100: preprocessing an inputted face image to obtain a preprocessed image;

step S200: training a source domain network 110 by using the preprocessed image, and migrating a parameter of the trained source domain network 110 to a target domain network 120. In the migrating process, for the source domain network 110, a loss function of the source domain network 110 is obtained according to an output of a softmax layer of the source domain network 110 with a T value greater than 1 and an original label; for the target domain network 120, a first sub-loss function of the target domain network 120 is obtained according to an output of a softmax layer of the target domain network 120 with a T value greater than 1 and the original label, a second sub-loss function of the target domain network 120 is obtained according to the output of the softmax layer of the target domain network 120 with the T value equal to 1 and the original label, and the first sub-loss function and the second sub-loss function are added to obtain a loss function of the target domain network 120;

step S300: classifying the preprocessed image into a noise image marked with a noise label and a truth-value image marked with a truth-value label, and inputting the noise image and the truth-value image into the target domain network to 120 obtain an image feature; and step S400: inputting the image feature into a residual network 210 to learn mapping from the image feature to a difference value between the noise label and the truth-value label to obtain a first predicted value, inputting the image feature into a standard neural network 220 to learn mapping from the image feature to the truth-value label to obtain a second predicted value, adding the first predicted value and the second predicted value and then inputting the added value into a first classifier 230 to obtain a first face beauty prediction result, inputting the second predicted value into a second classifier 240 to obtain a second face beauty prediction result, and obtaining a final face beauty prediction result according to the first face beauty prediction result and the second face beauty prediction result.

In the embodiment, a problem of insufficient number of samples is solved by using migration, and the target domain network 120 is enhanced by using the parameter of the source domain network 110, so that problems of an excessively large data volume required by a model, easy overfitting of the model, a weak generalization ability of the model, and a long training time are effectively solved, and the stability and robustness of the model are improved; moreover, a problem of unreliability of a database label is solved, and relevant model training may also be performed under a condition that a data label is inaccurate, insufficient and unspecific; and the present disclosure has strong adaptability, and can reduce a cost of data labeling and an influence of error labeling on the model.

Further, the inputted face image is data fused with multiple databases, including a LSFBD face beauty database, a Fer2013 face expression database, a GENKI-4K smile recognition database, an IMDB-WIKI 500k+ database, and a SCUT-FBP5500 database.

In the step S100, image enhancement processing, image correction processing, image clipping processing, image de-duplicating processing and image normalization processing are sequentially performed on the face image. The preprocessing can efficiently perform area detection and key point detection, as well as alignment and clipping on the face image, so that the face images have a same size, thus being convenient for subsequent operation.

The preprocessed image is inputted into the face beauty prediction model, and the face beauty prediction model executes the step S200, the step S300, and the step S400.

Further, in the step S200, the source domain network 110 is trained by using the preprocessed image, and the parameter of the trained source domain network 110 is migrated to the target domain network 120. In the migrating process, for the source domain network 110, the loss function of the source domain network 110 is obtained according to the output of the softmax layer of the source domain network 110 with the T value greater than 1 and the original label; for the target domain network 120, the first sub-loss function of the target domain network 120 is obtained according to the output of the softmax layer of the target domain network 120 with the T value greater than 1 and the original label, the second sub-loss function of the target domain network 120 is obtained according to the output of the softmax layer of the target domain network 120 with the T value equal to 1 and the original label, and the first sub-loss function and the second sub-loss function are added to obtain the loss function of the target domain network 120. The T value is increased, and then the T value is recovered to 1 in subsequent stage, so that the source domain network 110 trains parameter extraction of the preprocessed image.

The loss function is calculated, a gradient is decreased, and the parameter of the target domain network 120 is updated.

The T value is a regulation parameter, which is defined in a softmax function of the softmax layer, and the softmax function is specifically:

$$q_i = \frac{e^{\frac{z_i}{T}}}{\sum_j e^{\frac{z_j}{T}}},$$

wherein $q_i$ is an output of the softmax function, and z is an input of the softmax function. The larger the T value is, the flatter the distribution of the output of the softmax function is. When the T value tends to infinity, the output of the softmax function is uniformly distributed and similar to the source domain network 110.

In addition, for the migration process, an overall loss function is: L=CE(y, p)+αCE(q, p), wherein CE=−Σp*log q, and p is distribution generated by the source domain network 110.

Further, in the step S300, the target domain network 120 functions as a feature extraction layer. The feature extraction layer is one of VGG16, ResNet50, Google Inception V3, or DenseNet. In the embodiment, the target domain network 120 has a specific structure as follows. The first layer is a convolution layer with a size of 3*3; the second layer is a convolution layer with a size of 3*3; the third layer is a convolution layer with a size of 3*3; the fourth layer is a pooling layer; the fifth layer is a convolution layer with a size of 3*3; the sixth layer is a convolution layer with a size of 3*3; the seventh layer is a pooling layer; the eighth layer is a convolution layer with a size of 3*3; the ninth layer is a convolution layer with a size of 3*3; the tenth layer is a convolution layer with a size of 3*3; the eleventh layer is a pooling layer; the twelfth layer is a convolution layer with a size of 3*3; the thirteenth layer is a convolution layer with a size of 3*3; and the fourteenth layer is a pooling layer. The image feature is extracted by the feature extraction layer. Structure adjustment and parameter optimization may be performed on the feature extraction layer according to an actual task in an extraction process to find an optimal form.

Further, in the step S400, the image feature is inputted into the residual network 210 to learn the mapping from the image feature to the difference value between the noise label and the truth-value label to obtain the first predicted value, and all image features entering the residual network 210 are supervised by using the noise label. Moreover, the image feature is inputted into the standard neural network 220 to learn the mapping from the image feature to the truth-value label to obtain the second predicted value, and all image features entering the standard neural network 220 are supervised by using the truth-value label. The first predicted value and the second predicted value are added and then the added value is inputted into the first classifier 230 to obtain the first face beauty prediction result, and the second predicted value is inputted into the second classifier 240 to obtain the second face beauty prediction result. The final face beauty prediction result is obtained according to the first face beauty prediction result and the second face beauty prediction result. Specifically, K=w1*K1+w2*K2, wherein K is the final face beauty prediction result, w1 and w2 are weights, and K1 and K2 are respectively the first face beauty prediction result and the second face beauty prediction result.

The loss function of the first classifier 230 is:

$$L_{noise} = -\frac{1}{N_n} \sum_{i \in D_n} (y_i \ln(h_i) + (1 - y_i)\ln(1 - h_i)),$$

and the loss function of the second classifier 240 is:

$$L_{clean} = -\frac{1}{N_c} \sum_{j \in D_c} (v_j \ln(g_j) + (1 - v_j)\ln(1 - g_j)),$$

wherein $h_i$ is a sum of the first predicted value and the second predicted value, $g_j$ is the second predicted value, $y_i$ is the noise label, $v_j$ is the truth-value label, $D_n$ is the image feature, and $N_n$ is the number of the image feature.

In addition, an overall target of a part composed of the residual network 210, the standard neural network 220, the first classifier 230 and the second classifier 240 is:

$$\underset{W}{\operatorname{argmin}}((\alpha L_{clean,1} + L_{noise,1}) + \ldots + (\alpha L_{clean,n} + L_{noise,n})),$$

wherein W is a superparameter, α is a trade-off parameter between a loss value of the residual network 210 and a loss value of the standard neural network 220.

Figure 2:
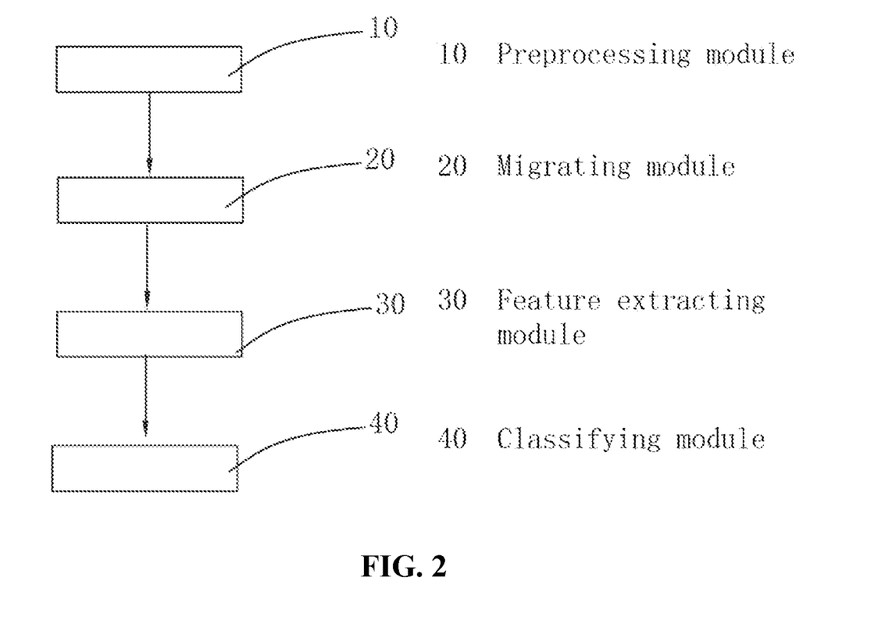
FIG. 2 is a structure diagram of a device for predicting beauty based on migration and weak supervision according to an embodiment of the present disclosure.

With reference to FIG. 2, some embodiments of the present disclosure provide a device for predicting beauty based on migration and weak supervision, which applies the method for predicting beauty based on migration and weak supervision as described in the method embodiment. The device for predicting beauty includes:

a preprocessing module 10 configured for preprocessing an inputted face image to obtain a preprocessed image;

a migrating module 20 configured for training a source domain network 110 by using the preprocessed image, and migrating a parameter of the trained source domain network 110 to a target domain network 120. In the migrating process, for the source domain network 110, a loss function of the source domain network 110 is obtained according to an output of a softmax layer of the source domain network 110 with a T value greater than 1 and an original label; for the target domain network 120, a first sub-loss function of the target domain network 120 is obtained according to an output of a softmax layer of the target domain network 120 with a T value greater than 1 and the original label, a second sub-loss function of the target domain network 120 is obtained according to the output of the softmax layer of the target domain network 120 with the T value equal to 1 and the original label, and the first sub-loss function and the second sub-loss function are added to obtain a loss function of the target domain network 120;

a feature extracting module 30 configured for classifying the preprocessed image into a noise image marked with a noise label and a truth-value image marked with a truth-value label, and inputting the noise image and the truth-value image into the target domain network 120 to obtain an image feature; and a classifying module 40 configured for inputting the image feature into a residual network 210 to learn mapping from the image feature to a difference value between the noise label and the truth-value label to obtain a first predicted value, inputting the image feature into a standard neural network 220 to learn mapping from the image feature to the truth-value label to obtain a second predicted value, adding the first predicted value and the second predicted value and then inputting the added value into a first classifier 230 to obtain a first face beauty prediction result, inputting the second predicted value into a second classifier 240 to obtain a second face beauty prediction result, and obtaining a final face beauty prediction result according to the first face beauty prediction result and the second face beauty prediction result.

In the device embodiment, the device for predicting beauty based on migration and weak supervision applies the method for predicting beauty based on migration and weak supervision as described in the method embodiment. Through cooperation of all modules, each step of the method for predicting beauty based on migration and weak supervision can be executed, with a same technical effect as the method for predicting beauty based on migration and weak supervision, which will not be described in detail herein.

According to some embodiments of the present disclosure, a device for predicting beauty based on migration and weak supervision is provided including a processor and a memory connected with the processor, where the memory is configured to store an executable instruction which, when executed by the processor, causes to execute the method for predicting beauty based on migration and weak supervision according to the method embodiment.

According some embodiments of the present disclosure, there is provided a storage medium storing an executable instruction which, when executed by a computer, causes the computer to execute the method for predicting beauty based on migration and weak supervision according to the method embodiment.

Examples of the storage medium include but are not limited to a phase-change RAM (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital video disk (DVD) or other optical storages, a magnetic cassette tape, magnetic tape and magnetic disk storages or other magnetic storage devices, or any other non-transmission medium, which may be used for storing information accessible to a computing device.

The foregoing is only the preferred embodiments of the present disclosure, and the present disclosure is not limited to the above embodiments. As long as it achieves the technical effect of the present disclosure by the same means, it should fall within the scope of protection of the present disclosure.

We claim:

1. A method for predicting beauty based on migration and weak supervision, comprising:
preprocessing an inputted face image to obtain a preprocessed image;
training a source domain network by using the preprocessed image, and migrating a parameter of the trained source domain network to a target domain network, wherein in the migrating process, for the source domain network, a loss function of the source domain network is obtained according to an output of a softmax layer of the source domain network with a T value greater than 1 and an original label; for the target domain network, a first sub-loss function of the target domain network is obtained according to an output of a softmax layer of the target domain network with a T value greater than 1 and the original label, a second sub-loss function of the target domain network is obtained according to the output of the softmax layer of the target domain network with the T value equal to 1 and the original label, and the first sub-loss function and the second sub-loss function are added to obtain a loss function of the target domain network;
classifying the preprocessed image into a noise image marked with a noise label and a truth-value image marked with a truth-value label, and inputting the noise image and the truth-value image into the target domain network to obtain an image feature; and
inputting the image feature into a residual network to learn mapping from the image feature to a difference value between the noise label and the truth-value label to obtain a first predicted value, inputting the image feature into a standard neural network to learn mapping from the image feature to the truth-value label to obtain a second predicted value, adding the first predicted value and the second predicted value and then inputting the added value into a first classifier to obtain a first face beauty prediction result, inputting the second predicted value into a second classifier to obtain a second face beauty prediction result, and obtaining a final face beauty prediction result according to the first face beauty prediction result and the second face beauty prediction result.

2. The method for predicting beauty based on migration and weak supervision of claim 1, wherein the preprocessing an inputted face image to obtain a preprocessed image comprises: sequentially performing image enhancement processing, image correction processing, image clipping processing, image de-duplicating processing and image normalization processing on the face image to obtain the preprocessed image.

3. The method for predicting beauty based on migration and weak supervision of claim 1, wherein the T value is a regulation parameter, which is defined in a softmax function of the softmax layer, and the softmax function is:

$$q_i = \frac{e^{\frac{z_i}{T}}}{\sum_j e^{\frac{z_j}{T}}},$$

wherein $q_i$ is an output of the softmax function, and z is an input of the softmax function.

4. The method for predicting beauty based on migration and weak supervision of claim 1, wherein the loss function of the first classifier is:

$$L_{noise} = -\frac{1}{N_n} \sum_{i \in D_n} (y_i \ln(h_i) + (1 - y_i)\ln(1 - h_i)),$$

and the loss function of the second classifier is:

$$L_{clean} = -\frac{1}{N_c} \sum_{j \in D_c} (v_j \ln(g_j) + (1 - v_j)\ln(1 - g_j)),$$

wherein $h_i$ is a sum of the first predicted value and the second predicted value, $g_j$ is the second predicted value, $y_i$ is the noise label, $v_j$ is the truth-value label, $D_n$ is the image feature, and $N_n$ is a number of the image feature.

5. A device for predicting beauty based on migration and weak supervision, comprising a processor and a memory connected with the processor, wherein the memory is configured to store an executable instruction which, when executed by the processor, causes the processor to execute steps of:

preprocessing an inputted face image to obtain a preprocessed image;

training a source domain network by using the preprocessed image, and migrating a parameter of the trained source domain network to a target domain network, wherein in the migrating process, for the source domain network, a loss function of the source domain network is obtained according to an output of a softmax layer of the source domain network with a T value greater than 1 and an original label; for the target domain network, a first sub-loss function of the target domain network is obtained according to an output of a softmax layer of the target domain network with a T value greater than 1 and the original label, a second sub-loss function of the target domain network is obtained according to the output of the softmax layer of the target domain network with the T value equal to 1 and the original label, and the first sub-loss function and the second sub-loss function are added to obtain a loss function of the target domain network;

classifying the preprocessed image into a noise image marked with a noise label and a truth-value image marked with a truth-value label, and inputting the noise image and the truth-value image into the target domain network to obtain an image feature; and inputting the image feature into a residual network to learn mapping from the image feature to a difference value between the noise label and the truth-value label to obtain a first predicted value, inputting the image feature into a standard neural network to learn mapping from the image feature to the truth-value label to obtain a second predicted value, adding the first predicted value and the second predicted value and then inputting the added value into a first classifier to obtain a first face beauty prediction result, inputting the second predicted value into a second classifier to obtain a second face beauty prediction result, and obtaining a final face beauty prediction result according to the first face beauty prediction result and the second face beauty prediction result.

6. The device for predicting beauty based on migration and weak supervision of claim 5, wherein the preprocessing an inputted face image to obtain a preprocessed image comprises: sequentially performing image enhancement processing, image correction processing, image clipping processing, image de-duplicating processing and image normalization processing on the face image to obtain the preprocessed image.

7. The device for predicting beauty based on migration and weak supervision of claim 5, wherein the T value is a regulation parameter, which is defined in a softmax function of the softmax layer, and the softmax function is:

$$q_i = \frac{e^{\frac{z_i}{T}}}{\sum_j e^{\frac{z_j}{T}}},$$

wherein $q_i$ is an output of the softmax function, and $z$ is an input of the softmax function.

8. The device for predicting beauty based on migration and weak supervision of claim 5, wherein the loss function of the first classifier is:

$$L_{noise} = -\frac{1}{N_n} \sum_{i \in D_n} (y_i \ln(h_i) + (1 - y_i)\ln(1 - h_i)),$$

and the loss function of the second classifier is:

$$L_{clean} = -\frac{1}{N_c} \sum_{j \in D_c} (v_j \ln(g_j) + (1 - v_j)\ln(1 - g_j)),$$

wherein $h_i$ is a sum of the first predicted value and the second predicted value, $g_j$ is the second predicted value, $y_i$ is the noise label, $v_j$ is the truth-value label, $D_n$ is the image feature, and $N_n$ is a number of the image feature.

9. A non-transitory storage medium storing an executable instruction which, when executed by a computer, causes the computer to execute steps of:

preprocessing an inputted face image to obtain a preprocessed image;

training a source domain network by using the preprocessed image, and migrating a parameter of the trained source domain network to a target domain network, wherein in the migrating process, for the source domain network, a loss function of the source domain network is obtained according to an output of a softmax layer of the source domain network with a T value greater than 1 and an original label; for the target domain network, a first sub-loss function of the target domain network is obtained according to an output of a softmax layer of the target domain network with a T value greater than 1 and the original label, a second sub-loss function of the target domain network is obtained according to the output of the softmax layer of the target domain network with the T value equal to 1 and the original label, and the first sub-loss function and the second sub-loss function are added to obtain a loss function of the target domain network;

classifying the preprocessed image into a noise image marked with a noise label and a truth-value image marked with a truth-value label, and inputting the noise image and the truth-value image into the target domain network to obtain an image feature; and inputting the image feature into a residual network to learn mapping from the image feature to a difference value between the noise label and the truth-value label to obtain a first predicted value, inputting the image feature into a standard neural network to learn mapping from the image feature to the truth-value label to obtain a second predicted value, adding the first predicted value and the second predicted value and then inputting the added value into a first classifier to obtain a first face beauty prediction result, inputting the second predicted value into a second classifier to obtain a second face beauty prediction result, and obtaining a final face beauty prediction result according to the first face beauty prediction result and the second face beauty prediction result.

10. The non-transitory storage medium of claim 9, wherein the preprocessing an inputted face image to obtain a preprocessed image comprises:

sequentially performing image enhancement processing, image correction processing, image clipping processing, image de-duplicating processing and image normalization processing on the face image to obtain the preprocessed image.

11. The non-transitory storage medium of claim 9, wherein the T value is a regulation parameter, which is defined in a softmax function of the softmax layer, and the softmax function is:

$$q_i = \frac{e^{\frac{z_i}{T}}}{\sum_j e^{\frac{z_j}{T}}},$$

wherein $q_i$ is an output of the softmax function, and z is an input of the softmax function.

12. The non-transitory storage medium of claim 9, wherein the loss function of the first classifier is:

$$L_{noise} = -\frac{1}{N_n} \sum_{i \in D_n} (y_i \ln(h_i) + (1 - y_i)\ln(1 - h_i)),$$

and the loss function of the second classifier is:

$$L_{clean} = -\frac{1}{N_c} \sum_{j \in D_c} (v_j \ln(g_j) + (1 - v_j)\ln(1 - g_j)),$$

wherein $h_i$ is a sum of the first predicted value and the second predicted value, $g_j$ is the second predicted value, $y_i$ is the noise label, $v_j$ is the truth-value label, $D_n$ is the image feature, and $N_n$ is a number of the image feature.

* * * * *